United States Patent
Yano et al.

(10) Patent No.: US 9,992,940 B2
(45) Date of Patent: Jun. 12, 2018

(54) HYDROPONIC CULTIVATION DEVICE

(71) Applicant: PANASONIC INTELLECTUAL PROPERTY MANAGEMENT CO., LTD., Osaka (JP)

(72) Inventors: Hiroshi Yano, Osaka (JP); Ayumi Sakai, Aichi (JP); Sayaka Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 303 days.

(21) Appl. No.: 14/912,503

(22) PCT Filed: Mar. 3, 2014

(86) PCT No.: PCT/JP2014/001137
§ 371 (c)(1),
(2) Date: Feb. 17, 2016

(87) PCT Pub. No.: WO2015/037164
PCT Pub. Date: Mar. 19, 2015

(65) Prior Publication Data
US 2016/0198652 A1    Jul. 14, 2016

(30) Foreign Application Priority Data
Sep. 12, 2013  (JP) ................................. 2013-189513

(51) Int. Cl.
*A01G 31/02* (2006.01)
*A01G 31/00* (2018.01)

(52) U.S. Cl.
CPC ........ *A01G 31/02* (2013.01); *A01G 2031/006* (2013.01); *Y02P 60/216* (2015.11)

(58) Field of Classification Search
CPC .. A01G 31/02; A01G 31/00; A01G 2031/006; A01G 31/06; A01G 25/165;
(Continued)

(56) References Cited

U.S. PATENT DOCUMENTS 4,332,105 A * 6/1982 Nir .......................... A01G 31/02
137/563
5,337,516 A * 8/1994 Hondulas ............... A01G 31/02
210/602
(Continued)

FOREIGN PATENT DOCUMENTS

JP          05292846 A   * 11/1993   ............. A01G 31/00
JP          06303866 A   * 11/1994   ............. A01G 31/00

OTHER PUBLICATIONS

Machine translation of JP-05292846 to Matsuoka, dated Nov. 1993.*
Machine translation of JP-06303866 to Okabe, dated Nov. 1994.*

*Primary Examiner* — Kathleen I Alker
(74) *Attorney, Agent, or Firm* — Greenblum & Bernstein, P.L.C.

(57) ABSTRACT

A hydroponic cultivating device includes a first spraying portion configured to supply a plant with water utilizing electric power; a second spraying portion configured to supply the plant with the water utilizing water-line pressure; a detecting portion configured to detect a state of electric power supply necessary for supplying the plant with the water by the first spraying portion; and a controlling portion configured to control the second spraying portion, wherein the controlling portion switches a city-water switching valve and a discharge switching valve from a closed state to an open state, and thereby, supplies the plant with the water by the second spraying portion, in a case where it is determined
(Continued)

that the electric power supply is stopped, based on the state of the electric power supply detected by the detecting portion.

4 Claims, 2 Drawing Sheets

(58) Field of Classification Search
CPC ...... A01G 9/247; A01G 27/00; A01G 27/003; A01G 27/005; A01G 27/006; A01G 27/008; A01G 27/02; Y02P 60/216
See application file for complete search history.

(56) References Cited

U.S. PATENT DOCUMENTS

| | | | | |
|---|---|---|---|---|
| 6,233,870 B1* | 5/2001 | Horibata | ................ | A01G 31/02 47/59 R |
| 7,832,142 B1* | 11/2010 | Olson | .................... | A01G 31/02 137/624.11 |
| 2012/0005957 A1* | 1/2012 | Downs, Sr. | ............ | A01G 31/02 47/62 A |
| 2014/0182204 A1* | 7/2014 | Church | .................. | A01G 31/02 47/62 N |
| 2015/0027548 A1* | 1/2015 | Moriarty | ................ | A01G 31/02 137/1 |
| 2016/0029580 A1* | 2/2016 | Sakai | .................... | A01G 31/02 47/62 R |

\* cited by examiner

HYDROPONIC CULTIVATION DEVICE

TECHNICAL FIELD

The present invention relates to a hydroponic cultivation device to grow a plant.

BACKGROUND ART

An artificial lighting type of plant factory, which grows plants under an environment controlled in a closed system where a space is enclosed, has been developed. In such an artificial lighting type of plant factory, hydroponics, in which plants are grown with their roots (underground portions) immersed in water without using any soil, is mainly adopted.

In the above hydroponics, electric power is mostly used as a power source for main functions such as water-circulating and lighting. Accordingly, in the hydroponics, there arises a problem that even a short time period of power failure significantly affects a plant.

As a technique related to the hydroponics described above, patent literatures 1 and 2 described below are known.

The patent literature 1 discloses a bed for hydroponics in which a place for reserving a cultivation solution is provided. The patent literature 2 discloses an oxygen aerating device configured to supply a cultivation solution with oxygen when water-circulation is stopped.

Techniques disclosed in the patent literatures 1 and 2 are merely to consider how to supply water to part of a plant which is always immersed in water. There is no consideration about a case where electric power supply is stopped in hydroponics in which water, for example, in the form of mist is supplied to a plant. Accordingly, if the mist supply is stopped, there is a possibility of affecting a growth of the plant.

The present invention has been made with the foregoing situation taken into consideration. An object of the present invention is to provide a hydroponic cultivation device capable of maintaining water supply to a plant even when electric power supply is stopped.

CITATION LIST

Patent Literature

[PTL 1] Japanese Patent Application Publication No. 08-336337
[PTL 2] Japanese Utility Model Application Publication No. 63-85063

SUMMARY OF INVENTION

A hydroponic cultivation device according to a first aspect of the present invention is a hydroponic cultivation device configured to supply water to a plant supported by a culture container, characterized in that the device comprises: a first water supplying unit configured to supply the plant with the water utilizing electric power; a second water supplying unit configured to supply the plant with the water utilizing water-line pressure; an electric power supply detecting unit configured to detect a state of electric power supply necessary for supplying the plant with the water by the first water supplying unit; and a controlling unit configured to control the second water supplying unit, wherein the second water supplying unit includes a first flow path opening/closing portion provided in a first flow path to supply the plant with the water sent by means of the water-line pressure and a second flow path opening/closing portion provided in a second flow path to discharge the water supplied to the plant to outside, and the controlling unit switches the first flow path opening/closing portion and the second flow path opening/closing portion from a closed state to an open state, and thereby, supplies the plant with the water by the second water supplying unit, in a case where it is determined that the electric power supply is stopped, based on the state of the electric power supply detected by the electric power supply detecting unit.

A hydroponic cultivation device according to a second aspect of the present invention is the hydroponic cultivation device according to the first aspect, wherein the device comprises a third flow path opening/closing portion provided in a third flow path to supply the first flow path with a nutrient solution, wherein the controlling unit switches the third flow path opening/closing portion from a closed state to an open state, and thereby, supplies the water including the nutrient solution by the second water supplying unit, in a case where it is determined that the electric power supply is stopped, based on the state of the electric power supply detected by the electric power supply detecting unit.

A hydroponic cultivation device according to a third aspect of the present invention is the hydroponic cultivation device according to the second aspect, wherein at least one of the first flow path opening/closing portion, the second flow path opening/closing portion, and the third flow path opening/closing portion is integrated with the electric power supply detecting unit.

A hydroponic cultivation device according to a fourth aspect of the present invention is the hydroponic cultivation device according to the third aspect, wherein at least one of the first flow path opening/closing portion, the second flow path opening/closing portion, and the third flow path opening/closing portion includes a timer unit operated by means of an incorporated battery, and the water sent by means of the water-line pressure or the nutrient solution is restricted based on time information clocked by the timer unit.

DESCRIPTION OF EMBODIMENTS

Figure 1:
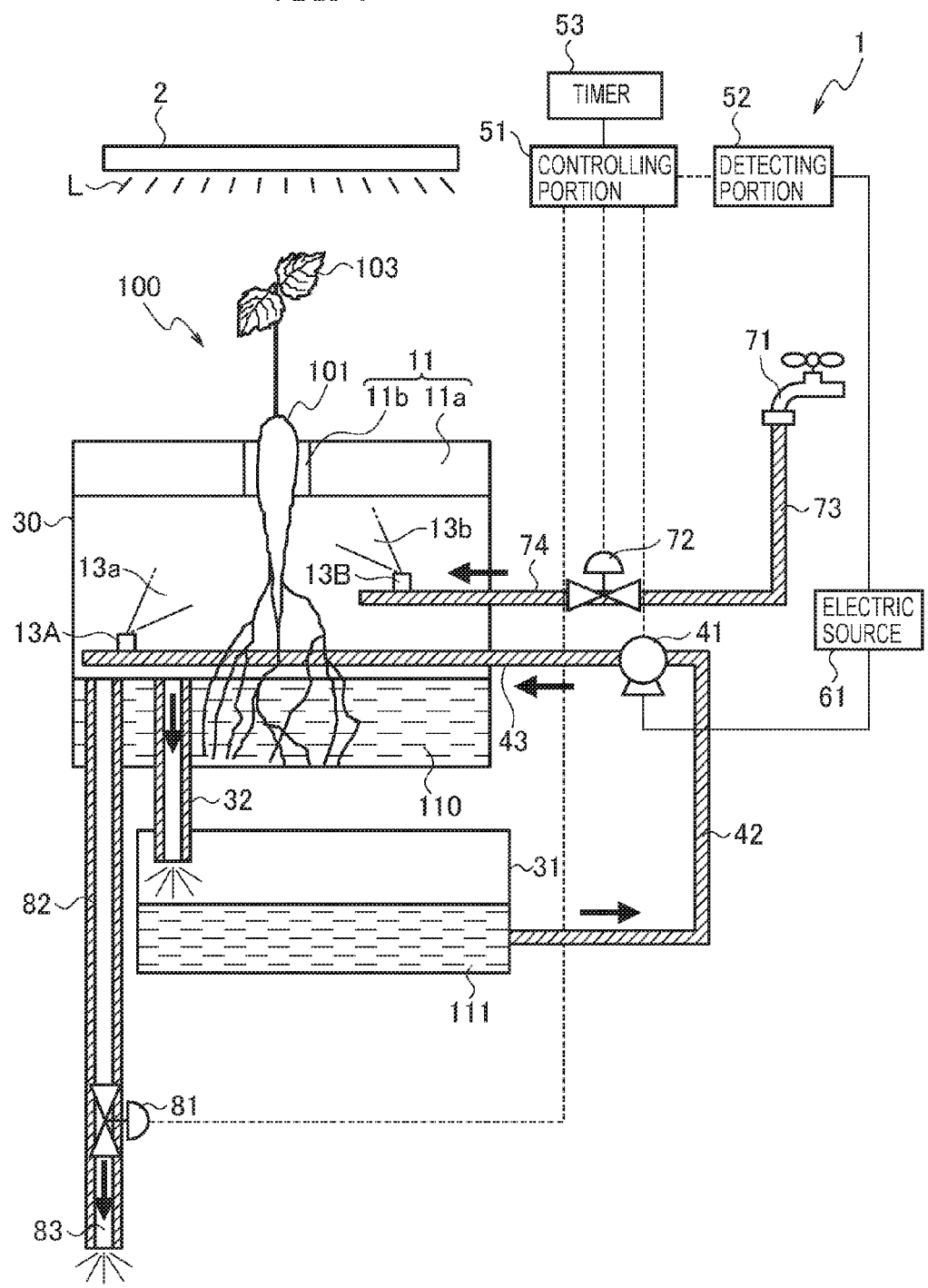
FIG. 1 is a sectional view showing one configuration example of embodiments of the present invention.

Referring to the drawings, descriptions will be hereinbelow provided for embodiments of the present invention.

A hydroponic cultivation device 1 to which the present invention is applied is configured as shown in FIG. 1, for example. The Hydroponic cultivation device 1 is to perform hydroponics in which no soil is used for growing a plant 100.

The hydroponic cultivation device 1 grows the plant 100 by supplying a liquid to a main root 101 as well as a lateral root (a secondary root) 102. The present embodiment provides explanation for the hydroponic cultivation device 1 configured to grow, as the plant 100, a plant such as a root crop that stores in an underground portion the nourishment synthesized in an aboveground portion. As an example of the root crop, such a ginseng (Panax ginseng, Asiatic ginseng) as the plant 100 shown in FIG. 1 is given. Although the ginseng is exemplified as the plant 100 in the present embodiment, the plant 100 is not limited to the ginseng. In the present embodiment, it is explained that a liquid is supplied to the plant 100. As the liquid, water or a culture solution prepared by adding a nutrient to water is raised.

The hydroponic cultivation device 1, which is shown in FIG. 1, comprises a culture container 30 configured to store a nutrient solution 110. The hydroponic cultivation device 1 includes a supporting portion 11 configured to support the main root 101 of the plant 100 in the culture container 30. The hydroponic cultivation device 1 supplies the water to the main root 101 as well as the lateral root 102 in a state of supporting the plant 100.

The supporting portion 11 includes a lid portion 11a and a penetrating portion 11b. The supporting portion 11 supports the main root 101 of the plant 100 from the sides. In the hydroponic cultivation device 1 shown in in FIG. 1, for example, a columnar sponge having the penetrating portion 11b at a center position of the lid portion 11a can be used for the supporting portion 11. Thus, the supporting portion 11 supports the plant 100 by a friction force between the sponge and the plant 100.

The supporting portion 11 may be implemented by any means, for example, means configured to suspend an underground portion such as a string, if it can support the plant 100. The lid portion 11a may include a plurality of penetrating portions 11b.

As for the plant 100 supported by the supporting portion 11, its upper tip end of the main root 101 is exposed from the lid portion 11a. A stem with leaves 103 extends upward from an upper tip end of the main root 101. Above the hydroponic cultivation device 1, a lighting portion 2 is provided. The lighting portion 2 is made with a plurality of LEDs, for example. The stem with leaves 103 can perform photosynthesis by receiving light L emitted from the lighting portion 2.

In a state where the plant 100 is supported, the lateral root 102 of the plant 100 is immersed into the nutrient solution 110 stored at a bottom portion of the culture container 30. Thereby, the hydroponic cultivation device 1 supplies the water to the lateral root 102.

The culture container 30 is provided with a pipe 32, an opening of which is positioned at a prescribed height in the culture container 30. The nutrient solution 110 is discharged from the pipe 32 to a reserving tank 31, if the nutrient solution 110 reaches the prescribed height. A nutrient solution 111 reserved in the reserving tank 31 is pumped up by a nutrient solution supplying pump 41.

The nutrient solution supplying pump 41 is driven consuming electric power supplied from an electric source 61. The nutrient solution supplying pump 41 is driven to draw the nutrient solution 111 of the reserving tank 31 through a pipe 42. The nutrient solution supplying pump 41 discharges the nutrient solution 111 at a prescribed pressure to a first spraying portion 13A side through a pipe 43.

The first spraying portion 13A supplies the water toward the main root 101 of the plant 100. More specifically, the first spraying portion 13A puts the nutrient solution 111 sent from the pipe 43 into an atomized state (a misty state) by spraying a nutrient solution 13a from its nozzle portion. The first spraying portion 13A may be configured to drop the nutrient solution to the main root 101.

Although only one first spraying portion 13A is shown in FIG. 1, a plurality of spraying portions 13A may be used. For example, the first spraying portion 13A may be configured to spray the nutrient solution 13a toward a center from four sides of the culture container 30. The first spraying portion 13A may be provided at any height position in the culture container 30, if it is possible to supply the nutrient solution 13a to the main root 101.

A spraying way of the first spraying portion includes a spraying way using a high-pressured gas, a supersonic mist, and the like. Further, although it is desirable that a mist made with two fluids is used, a mist made with one fluid may be used. In addition, aside from the above, a nutrient film technique (NFT) or a deep flow technique (DFT) may be adopted. In other words, a way for supplying water in cultivation is not limited to the foregoing.

The hydroponic cultivation device 1 as described above supplies the water to the main root 101 as well as the lateral root 102 of the plant 100 utilizing the electric power of the electric source 61, during normal cultivation in which the electric power supply from the electric source 61 is not stopped. Thereby, the nutrient solution 13a in the form of mist is sprayed from the first spraying portion 13A and is blown against the main root 101. An excessive nutrient solution 13a falls toward the bottom of the culture container 30. The nutrient solution 110, which is stored in the culture container 30, passes through the pipe 32 so as to be reserved in the reserving tank 31. The nutrient solution 111 reserved is sent again to the first spraying portion 13A by the nutrient solution supplying pump 41.

In a case of the normal cultivation, a city-water switching valve 72 remains closed. In addition, during the normal cultivation, a second spraying portion 13B as emergent water supplying means is not operated.

Furthermore, the hydroponic cultivation device 1 includes a detecting portion 52 as electric power detecting means. The detecting portion 52 detects a state of electric power supply necessary for supplying the water to the plant 100 by the first spraying portion 13A (the first water supplying unit). More specifically, the detecting portion 52 detects a voltage value and a current value corresponding to electric power that is being supplied from the electric source 61 to the nutrient solution supplying pump 41 and the like. The state of the electric power supply detected by the detecting portion 52 is read by a controlling portion 51.

Moreover, the hydroponic cultivation device 1 includes a configuration for supplying the water to the plant 100 in a case of emergency where the electric power supply from electric source 61 is stopped. As the configuration, the hydroponic cultivation device 1 comprises the second spraying portion 13B, a hydrant 71, the city-water switching valve 72, as well as pipes 73 and 74. The hydroponic cultivation device 1 further comprises a discharge switching valve 81, a pipe 82, and a pipe 83.

The second spraying portion 13B is connected to the hydrant 71, the city-water switching valve 72, the pipe 73, and the pipe 74. The pressure of city-water is exerted on the pipe 73 from the hydrant 71. During the normal cultivation, the city-water switching valve 72 remains closed. Accordingly, in a case of the normal cultivation, city-water 13b is not sprayed from the second spraying portion 13B.

In a case of emergency where the electric power supply from the electric source 61 is stopped, the city-water switching valve 72 is switched from an open state to a closed state. Thereby, the city-water is supplied from the hydrant 71 to the second spraying portion 13B through the pipe 73, the city-water switching valve 72, and the pipe 74.

The second spraying portion 13B supplies the city-water sent from the pipe 74 to the main root 101 of the plant 100. More specifically, the second spraying portion 13B puts the city-water sent from the pipe 74 into an atomized state (a mist state) by spraying the city-water 13b from its nozzle portion. Please note that the second spraying portion 13B has only to implement water supply by water-line pressure alone. Any method, for example, a spraying method, a dropping method, and another water supplying method may be adopted.

The city-water 13b sprayed from the second spraying portion 13B is stored at the bottom portion of the culture container 30. In order to discharge the liquid stored, the discharge switching valve 81 is switched into an open state. In a case where the discharge switching valve 81 is put into the open state, the liquid reserved can be discharged from an opening of an upper end portion of the pipe 82 through the pipe 82, the discharge switching valve 81, and the pipe 83.

As described above, the controlling portion 51 controls the second water supplying unit (the second spraying potion 13B) configured to supply the plant 100 with the water utilizing the water-line pressure. The controlling portion 51 determines whether or not the electric power supply is stopped, based on the state of the electric power supply detected by the detecting portion 52. In a case where the electric power supplied from the electric power source 61 to each portion is decreased, the controlling portion 51 determines that the electric power supply is stopped.

In a case where the electric power supply is stopped, the controlling portion 51 puts the city-water switching valve 72 and the discharge switching valve 81 in an open state. Thereby, the city-water 13b is sprayed from the second spraying portion 13B, and part of the nutrient solution 110 stored at the bottom of the culture container 30 is discharged.

As seen from the above, the hydroponic cultivation device 1 supplies the water to the plant 100 that is supported by the culture container 30. The hydroponic cultivation device 1 includes the first water supplying unit (the first spraying portion 13A) configured to supply the plant 100 with the water utilizing the electric power. In addition, the hydroponic cultivation device 1 includes the second water supplying unit (the second spraying portion 13B) configured to supply the plant 100 with the water utilizing the water-line pressure.

Moreover, the hydroponic cultivation device 1 has the electric power supply detecting unit (the detecting portion 52) configured to detect the state of the electric power supply necessary for supplying the water to the plant 100 by the first water supplying unit. Further, the hydroponic cultivation device 1 includes the controlling unit (the controlling portion 51) configured to control the second water supplying unit.

In the above hydroponic cultivation device 1, the second water supplying unit includes the first flow opening/closing portion (the city-water switching valve 72) provided in the first flow path (the pipe 73, the pipe 74) to supply the plant 100 with the water sent by means of the water-line pressure. In addition, the second water supplying unit includes the second flow path opening/closing portion (the discharge switching valve 81) provided in the second flow path (the pipe 82, the pipe 83) configured to discharge the water supplied to the plant 100 to the outside.

Furthermore, in the above hydroponic cultivation device 1, the controlling unit switches the first flow path opening/closing portion and the second flow path opening/closing portion from a closed state to an open state, in a case where it is determined that the electric power supply is stopped, based on the state of the electric power supply detected by the electric power supply detecting unit. Thereby, the hydroponic cultivation device 1 supplies the water to the plant 100 by the second water supplying unit.

Therefore, according to the hydroponic cultivation device 1 can maintain water supply to the plant 100, even in a case where the electric power supply is stopped. For example, in a case where the electric power supply is stopped by power failure or the like, the stop of nutrient solution supply, lighting portion 2, and the like adversely affects cultivation. On the other hand, according to the hydroponic cultivation device 1, it is possible to maintain water supply, and therefore, suppress defective cultivation. Further, according to the hydroponic cultivation device 1, it is possible to suppress the defective cultivation with a simple configuration when the electric power supply is stopped.

Figure 2:
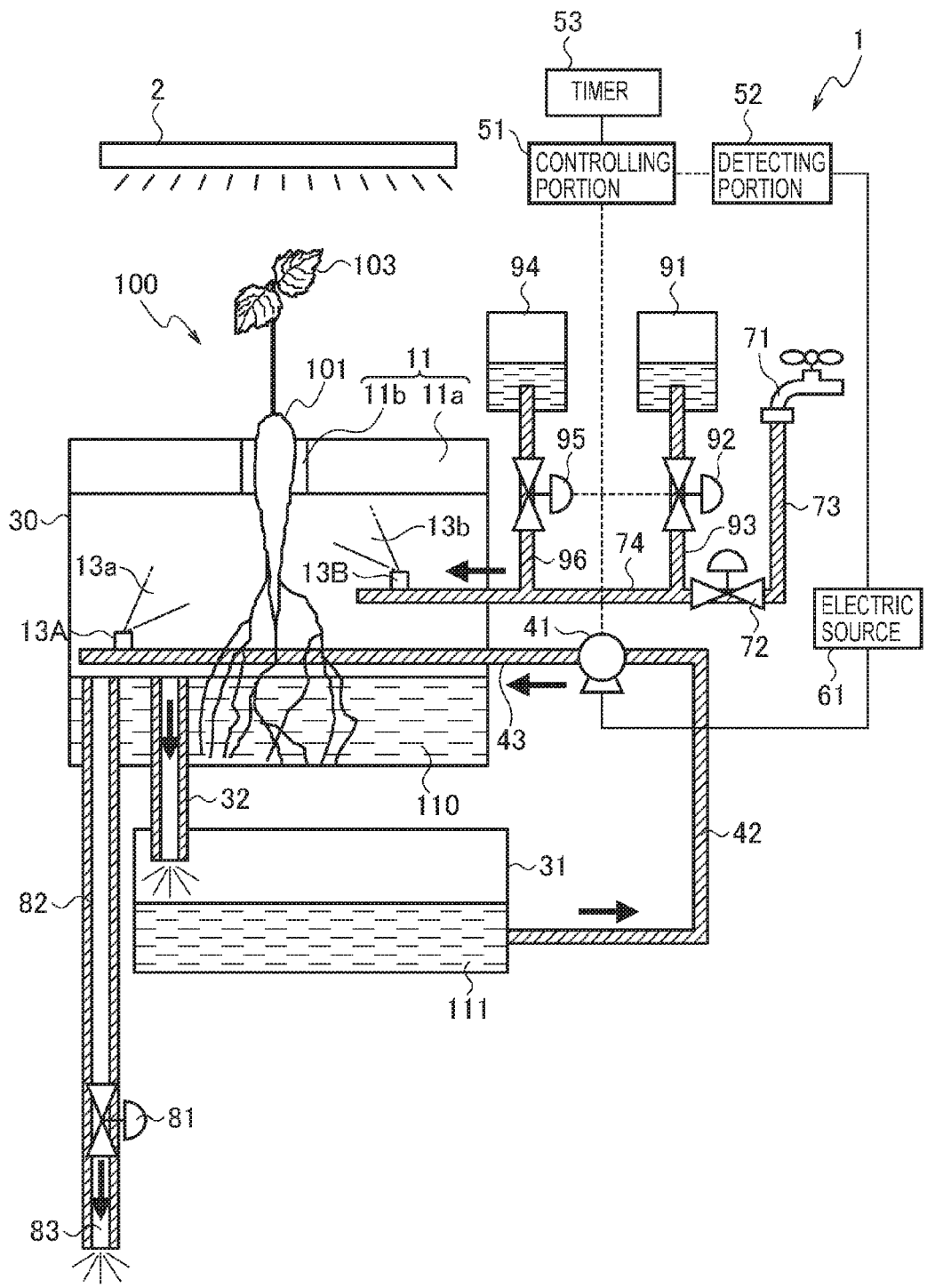
FIG. 2 is a sectional view showing another configuration example of embodiments of the present invention.

In the hydroponic cultivation device 1 described above, water supplied when the electric power supply is stopped is usual city-water. Since the city-water does not contain a liquid-manure (a fertilizer), it can be not said that the city-water is best suitable for the plant 100. Therefore, it is desirable that the hydroponic cultivation device 1, as shown in FIG. 2, is configured so as to supply the nutrient solution to the pipe 74.

The hydroponic cultivation device 1 further comprises a nutrient solution reserving portion 91, a nutrient solution switching valve 92, and a pipe 93, as compared with the hydroponic cultivation device 1 shown in FIG. 1. In addition, the hydroponic cultivation device 1 comprises a nutrient solution reserving portion 94, a nutrient solution switching valve 95, and a pipe 96. In the nutrient solution reserving portion 91 and the nutrient solution reserving portion 94, prescribed amounts of nutrient solutions are previously stored, respectively.

In a case where the electric power supply is stopped, the hydroponic cultivation device 1 switches the nutrient solution switching valve 92 and the nutrient solution switching valve 95 from a closed sate to an open state. Thereby, the nutrient solutions, which are stored in the nutrient solution reserving portion 91 and the nutrient solution reserving portion 94, flow into the pipe 74, respectively. Thereafter, the nutrient solutions, which have flown into the pipe 74, are mixed with the city-water and supplied to the second spraying portion 13B.

As described above, the hydroponic cultivation device 1 includes the third flow path opening/closing portions (the nutrient solution switching valve 92, the nutrient solution switching valve 95) provided in the third flow paths (the pipe 93, the pipe 96) configured to supply the nutrient solutions to the first flow path (the pipe 74).

The controlling unit (the controlling portion 51) switches the third flow path opening/closing portions, in a case where it is determined that electric power supply is stopped, based on the state of the electric power supply detected by electric power supply detecting unit (the detecting portion 52). Thereby, the hydroponic cultivation device 1 supplies the water including the nutrient solutions by the second water supplying unit (the second spraying portion 13B).

Therefore, according to the hydroponic cultivation device 1, it is possible to provide the city-water including the nutrient solutions to the plant 100, even in a case where the electric power supply is stopped. Thereby, according to the hydroponic cultivation device 1, it is possible to further suppress defective cultivation.

Moreover, in the hydroponic cultivation device 1 may be configured, at least one of the first flow path opening/closing portion (the city-water switching valve 72), the second flow path opening/closing portion (the discharge switching valve 81), and the third flow path opening/closing portion (the nutrient solution switching valve 92, the nutrient solution switching valve 95) may be integrated with the detecting portion 52.

The electric power from the power source 61 is supplied to the city-water switching valve 72, the discharge switching valve 81, the nutrient solution switching valve 92, and the nutrient solution switching valve 95. The city-water switching valve 72, the discharge switching valve 81, the nutrient solution switching valve 92, and the nutrient solution switching valve 95 are to be opened and/or closed by means of motive power generated by an actuator consuming the electric power.

The detecting portion 52, which is provided in at least one of the city-water switching valve 72, the discharge switching valve 81, the nutrient solution switching valve 92, and the nutrient solution switching valve 95, monitors the state of the electric power supply sent from the power source 61 to the actuator. The controlling portion 51 monitors the state of the electric power supply by the detecting portion 52, and thereby, controls the city-water switching valve 72, the discharge switching valve 81, the nutrient solution switching valve 92, and the nutrient solution switching valve 95 so as to put the respective valves into an open state, in a case where it is determined that the electric power supply is stopped.

As described above, in the hydroponic cultivation device 1, at least one of the city-water switching valve 72, the discharge switching valve 81, the nutrient solution switching valve 92, and the nutrient solution switching valve 95 is integrated with the detecting portion 52. Accordingly, like the hydroponic cultivation device 1 described above, the hydroponic cultivation device 1 can maintain water supply to the plant by means of controlling so as to put the respective valves into an open state when the electric power supply is stopped.

Furthermore, in the hydroponic cultivation device 1, it is desirable that at least one of the city-water switching valve 72, the discharge switching valve 81, the nutrient solution switching valve 92, and the nutrient solution switching valve 95 comprises a timer unit (53). The timer unit is operated by means of an incorporated battery.

The hydroponic cultivation device 1 restricts the water supplied by means of the water-line pressure or the nutrient solution based on time information clocked by the timer unit (53), when the electric power supply is stopped. More specifically, in the hydroponic cultivation device 1, an execution time period of water supply and a non-execution time period of water supply are set.

In the hydroponic cultivation device 1, even in a case where the electric power supply is stopped, it is possible to set the execution time period of water supply and the non-execution time period of water supply. Therefore, according to the hydroponic cultivation device 1, it is possible to supply water as desired and suppress an excessive amount of water supply.

Furthermore, in the hydroponic cultivation device 1, the timer unit (53) may be provided to the city-water switching valve 72 only. In the hydroponic cultivation device 1, the timer unit (53) may be provided to the nutrient solution switching valve 92 and the nutrient solution switching valve 95, in addition to the city-water switching valve 72. In the hydroponic cultivation device 1, it is possible to set to desired values a time period and an interval when the nutrient solution switching valve 92 and the nutrient solution switching valve 95 are open. Thereby, it is possible to optimize not only the city-water, but also the concentration of the nutrient solution in the city-water.

It should be noted that the foregoing embodiments are examples of the present invention. For this reason, the present invention is not limited to the foregoing embodiments. It is a matter of course that depending on the design and the like, various changes which may lead to other embodiments can be made to the present invention within a scope not departing from the technical concept concerning the present invention.

For example, in the hydroponic cultivation device 1, the city-water switching valve 72, the discharge switching valve 81, the nutrient solution switching valve 92, and the nutrient solution switching valve 95 may be configured with a normally-open type of solenoid valve. In other words, the respective valves 72, 81, 92, and 95 maintain an "open" state when the electric power supply is off, and are closed when excited (the electric power supply is on). In this case, the controlling portion 51 performs control to put the respective valves 72, 81, 92, and 95 into a closed state during the normal cultivation. On the other hand, the respective valves 72, 81, 92, and 95 are switched to an open state, when the electric power supply is stopped.

All the contents of Japanese Patent Application No. 2013-189513 (filed on Sep. 12, 2013) are incorporated herein by reference.

INDUSTRIAL APPLICABILITY

According to the present invention, it is possible to maintain water supply to a plant even when electric power supply is stopped.

REFERENCE SIGNS LIST 1 hydroponic cultivation device
3 controlling portion
13A first spraying portion
13B second spraying portion
30 culture container
31 reserving tank
41 nutrient solution supplying pump
51 controlling portion
52 detecting portion
71 hydrant
72 city-water switching valve
81 discharge switching valve
91, 94 nutrient solution reserving portion
92, 95 nutrient solution switching valve
96 pipe

The invention claimed is:

1. A hydroponic cultivation device configured to supply water to a plant supported by a culture container, wherein the device comprises:
a first water supplying unit configured to supply the plant with the water utilizing electric power;
a second water supplying unit configured to supply the plant with the water utilizing water-line pressure;
an electric power supply detecting unit configured to detect a state of electric power supply necessary for supplying the plant with the water by the first water supplying unit; and
a controlling unit configured to control the second water supplying unit, wherein
the second water supplying unit includes a first flow path opening/closing portion provided in a first flow path to supply the plant with the water sent by means of the water-line pressure and a second flow path opening/closing portion provided in a second flow path to discharge the water supplied to the plant to outside, and
the controlling unit switches the first flow path opening/closing portion and the second flow path opening/closing portion from a closed state to an open state, and thereby, supplies the plant with the water by the second water supplying unit, in a case where it is determined that the electric power supply is stopped, based on the state of the electric power supply detected by the electric power supply detecting unit.

2. The hydroponic cultivation device according to claim 1, comprising a third flow path opening/closing portion provided in a third flow path to supply the first flow path with a nutrient solution, wherein the controlling unit switches the third flow path opening/closing portion from a closed state to an open state, and thereby, supplies the water including the nutrient solution by the second water supplying unit, in a case where it is determined that the electric power supply is stopped, based on the state of the electric power supply detected by the electric power supply detecting unit.

3. The hydroponic cultivation device according to claim 2, wherein at least one of the first flow path opening/closing portion, the second flow path opening/closing portion, and the third flow path opening/closing portion is integrated with the electric power supply detecting unit.

4. The hydroponic cultivation device according to claim 3, wherein at least one of the first flow path opening/closing portion, the second flow path opening/closing portion, and the third flow path opening/closing portion includes a timer unit operated by means of an incorporated battery, and the water sent by means of the water-line pressure or the nutrient solution is restricted based on time information clocked by the timer unit.

* * * * *